US008514538B2

(12) United States Patent
Crevenat et al.

(10) Patent No.: US 8,514,538 B2
(45) Date of Patent: Aug. 20, 2013

(54) OVERVOLTAGE PROTECTION DEVICE COMPRISING A DISCONNECTION ACCESSORY

(75) Inventors: Vincent Crevenat, La Gouarde (FR); Gautier Boris, Lourdes (FR)

(73) Assignee: ABB France, Rueil-Malmaison Cedex (FR)

( * ) Notice: Subject to any disclaimer, the term of this patent is extended or adjusted under 35 U.S.C. 154(b) by 413 days.

(21) Appl. No.: 12/809,245

(22) PCT Filed: Dec. 18, 2008

(86) PCT No.: PCT/FR2008/017777

§ 371 (c)(1), (2), (4) Date: Jun. 18, 2010

(87) PCT Pub. No.: WO2009/103896

PCT Pub. Date: Aug. 27, 2009

(65) Prior Publication Data

US 2011/0013330 A1 Jan. 20, 2011

(30) Foreign Application Priority Data

Dec. 18, 2007 (FR) ..................................... 07 08820

(51) Int. Cl.
*H02H 3/08* (2006.01)
*H02H 5/04* (2006.01)

(52) U.S. Cl.
USPC ............ 361/105; 361/115; 361/103; 361/124

(58) Field of Classification Search
USPC ................................. 361/115, 103, 105, 124
See application file for complete search history.

(56) References Cited

U.S. PATENT DOCUMENTS

| | | | | |
|---|---|---|---|---|
| 2,683,199 | A * | 7/1954 | Spires, Jr. | 337/40 |
| 4,541,030 | A * | 9/1985 | Biegelmeier | 361/56 |
| 4,795,997 | A * | 1/1989 | Fisher et al. | 337/380 |
| 4,868,535 | A * | 9/1989 | Janniere et al. | 337/68 |
| 5,173,674 | A * | 12/1992 | Pannenborg et al. | 335/35 |
| 6,430,019 | B1 * | 8/2002 | Martenson et al. | 361/124 |

* cited by examiner

*Primary Examiner* — Rexford Barnie
*Assistant Examiner* — Zeev V Kitov
(74) *Attorney, Agent, or Firm* — Michael M. Rickin; Paul R. Katterle

(57) ABSTRACT

A device for protecting against overvoltages that includes at least one overvoltage protection component (11); a thermosensitive member (17) capable of deforming, dependent upon the temperature thereof; a thermal connection between the at least one protection member and the thermosensitive member; and at least one mechanical member (15) for cooperating with the thermosensitive member and capable of cooperating with a system for triggering an electrical cut-off device (2). The thermosensitive member (17) and the at least one mechanical member (15) are arranged such that, when the thermosensitive member exceeds a given temperature threshold, the thermosensitive member, by reason of the deformation thereof, causes a movement of said at least one mechanical member (15) which correspondingly actuates the system for triggering the electrical cut-off device.

21 Claims, 10 Drawing Sheets

OVERVOLTAGE PROTECTION DEVICE COMPRISING A DISCONNECTION ACCESSORY

CROSS-REFERENCE TO RELATED APPLICATION

This is a National Phase Application filed under 35 U.S.C. 371 of International Application No. PCT/FR2008/001777, filed on Dec. 18, 2008, which claims priority under 35 U.S.C. §119 to French Application No. 0708820, filed on Dec. 18, 2007; the entire contents of both applications being hereby incorporated by reference.

BACKGROUND OF THE INVENTION

The present invention relates to the general technical field of devices for protecting electrical equipment or installations against electrical disturbances, in particular against transient overvoltages due in particular to a lightning strike. This invention relates more particularly to a protection device, such as a varistor-type surge arrester, associated with or intended to be associated with an electric cut-off device such as a circuit breaker.

It is known to ensure overvoltage protection of an electrical installation by means of devices including at least one overvoltage protection component, in particular one or more varistors and/or a spark gap. In the most frequent cases, a varistor is hooked up between one phase and the neutral conductor of the electrical installation while a spark gap is connected between the neutral conductor and ground.

In the event of failure of the or one of the protection components, these devices include a disconnection system serving to isolate the protection component or components of the electrical installation as a safety measure.

In particular, in the case of a varistor connected between one phase and a neutral conductor, it is conventional to provide a thermal protection, which is required by the international standards applicable to these devices. The thermal protection serves to disconnect the varistor of the electrical installation being protected in the event of overheating of the varistor, e.g., above 150° C. This overheating of the varistor is due to the increased leakage current therethrough—generally a few tens of milliamperes—due to the ageing of same. In this case, reference is made to the thermal runaway of the varistor.

Thermal protection often consists of one or more low-temperature welds elastically holding a restraining element in place, the melting of the weld or welds enabling the movement of this element with the effect of opening the circuit of the varistor. Thermal protection devices of this type are described in particular in EP-A-0 716 493, EP-A-0 987 803 and EP-A-0 905 839.

Sometimes, thermal protection is based on an electronic measurement of the current, as described, for example, in FR-A-2 873 510, which has the disadvantage of being very costly.

Protection can also be provided specifically against short-circuits and separate from the thermal protection. It serves to disconnect the varistor in the event of a complete short-circuiting thereof, e.g., subsequent to a significant lightning strike. This generally involves a thermomagnetic circuit breaker.

Whether it be for thermal protection or for protection against short-circuits, it is generally provided for the disconnection of the varistor to occur without causing the general cut-off members of the electrical installation to open, so as to ensure a continuity of service of the electrical installation.

The disadvantage is that the thermal protection and the protection against short-circuits are separate and each use a respective cut-off device. That of the thermal protection can have a low breaking capacity while that of the short-circuit protection must be capable of cutting off very high currents. However, the fact of using two cut-off devices has the disadvantage of both increasing the spatial requirements of the protection device and the cost thereof.

Thus, an overvoltage protection device was proposed in EP-A-1 607 995, comprising a protection module and a circuit breaker. The protection module comprises a varistor and a spark gap, which are connected to the electrical network being protected by the circuit breaker. In order to ensure disconnection of the varistor and the spark gap in the event of the failure of one of them, the protection module includes separating means in order to cause the circuit breaker to open. More precisely, these separating means consist of a thermal pin arranged on an area in thermal connection with the varistor and an electric fuse connected in series with the spark gap. The thermal pin is made of a metal alloy or of a material which is thermofusible at a low melting temperature. When the pin or the fuse melts or breaks, a mechanical actuating system ensures that the circuit breaker is triggered and, as a result, that the varistor and spark gap are disconnected from the electrical network. More particularly, the mechanical actuating system includes a lever, which is connected to the thermal pin, and another lever, which is connected to the fuse, these levers being pulled by a respective return spring. In the event that the pin or the fuse melts, the corresponding lever acts on a control centraliser under the influence of the return spring, the control centraliser actuating the circuit breaker triggering mechanism by means of a mechanical link.

However, this device has several disadvantages. A pin made of a thermofusible material is thus not very precise as concerns the temperature at which it melts or breaks and therefore causes the circuit breaker to be triggered. The metal alloy pin having a low melting temperature ensures a higher degree of precision, but, besides the higher cost thereof, has the disadvantage of being very difficult to produce and generally contains lead or cadmium-type polluting materials.

In addition, EP-A-1 447 831 describes a device for protecting against overvoltages due to lightning, by combining a lightning arrester block and a thermomagnetic circuit breaker, the lightning arrester block comprising a varistor. According to one embodiment, the lightning arrester block includes a thermal disconnector, which is thermally connected to the varistor 12. The thermal disconnector consists of a low-temperature weld cooperating with an elastic strip triggering the circuit breaker after the weld melts under the effect of the heat from a thermal runaway of the varistor. This embodiment has disadvantages similar to those previously mentioned with regard to the thermal pin made of a metal alloy.

According to another embodiment, this document teaches to thermally connect the bimetallic strip of the circuit breaker to the varistor. If the bimetallic strip of the circuit breaker is not sufficiently deflected when the currents appearing during the thermal runaway of the varistor pass therethrough, the thermal connection between said varistor 12 and the bimetallic strip produces sufficient deflection to cause the circuit breaker to be triggered, the latter of which disconnects the lightning arrester block from the electrical network. However, this embodiment also has disadvantages. In particular, it is not possible to use conventional commercial circuit-breakers because they are not intended to enable the bimetallic strip thereof to be thermally connected to an element outside the circuit breaker box. Such a device requires modification of the circuit breaker design in order to be capable of effectively conveying the heat released by the varistor to the bimetallic strip of the circuit breaker. Furthermore, the circuit breaker cannot be freely chosen, taking into account the fact that the bimetallic strip thereof must be designed to cause the circuit breaker to be triggered at a given critical temperature reached by the varistor.

An overvoltage protection device is also known from WO 2004/064213, which comprises a varistor and a means for breaking the electric current passing through the varistor. In one alternative, this breaking means includes a sliding rod holding an electrical contact element enabling the electrical circuit of the varistor to be opened or closed. During normal operation, the rod is pre-stressed in the closed position of the contact by means of stop-motion device in the form of a plate arranged at the end of a bimetallic strip. The bimetallic strip is mounted and positioned in the device so as to be sensitive to the heat released by the varistor. In the event of overheating, the bimetallic strip bends so as to disengage the stop-motion device in order to release the rod, which is pushed by a spring towards the open position of the contact. In another alternative, the varistor is powered via the bimetallic strip and a conductive element arranged at one end of the bimetallic strip. During normal operation, this conductive element is in electrical contact with a connector, thereby enabling the varistor to be powered. In the event of overheating, the bimetallic strip bends so as to distance the conductive element from the connector, the effect of which is to shut off the electrical power supply of the varistor. In addition, an insulating shield is placed between the conductive element and the connector in order to prevent reclosing of the circuit when the bimetallic strip returns to the initial position thereof after cooling.

In the two alternatives, these devices have the disadvantage of requiring a meticulous bimetallic strip design, as well as good mounting accuracy. As a matter of fact, dependent upon this is the contact force applied to the electrical contact of the breaking means during normal operation, which must be capable of conducting very high currents in the event of lightning-related overvoltages on the electrical network. Furthermore, the deformation tolerance of the bimetallic strips relative to temperature require an individual adjustment similar to that implemented to adjust the calibres of modular circuit breakers. Furthermore, the slow and gradual opening of the contacts does not enable a short-circuit current to be cut off.

SUMMARY OF THE INVENTION

The present invention provides an overvoltage protection device which at least partially mitigates the aforesaid disadvantages. More particularly, the invention provides such a device which is of easy and reliable implementation.

To that end, this invention proposes an overvoltage protection device, comprising:

at least one overvoltage protection component;

a thermosensitive member capable of deforming, dependent upon the temperature thereof;

a thermal connection between the at least one protection member and the thermosensitive member; and at least one resettable mechanical member for cooperating with the thermosensitive member and capable of cooperating with a system for resettably triggering an electrical cut-off device;

wherein the thermosensitive member and the at least one mechanical member are arranged such that, when the thermosensitive member exceeds a given temperature threshold, the thermosensitive member, by reason of the deformation thereof, causes a movement of said at least one mechanical member capable of actuating the system for triggering the electrical cut-off device to cut-off electrical power to the at least one overvoltage protection component without cutting off electrical power to users of the electrical power external to the overvoltage protection device.

According to preferred embodiments, the invention includes one or more of the following characteristics:

the thermosensitive member and the at least one mechanical member are arranged such that, when the thermosensitive member exceeds a given temperature threshold, the thermosensitive member, by reason of the deformation thereof, moves said at least one mechanical member in order to actuate the system for triggering the electrical cut-off device;

the thermosensitive member is chosen from amongst the group consisting of: a bimetallic strip, a heat-retractable element, and a deformable capsule filled with a fluid causing deformation of the capsule when the fluid exceeds said given temperature threshold, the fluid preferably being a refrigerant fluid;

the thermosensitive member has a bistable deformation property giving to it a stable non-deformed configuration as long as its temperature does not exceed the given temperature threshold, as well as a stable deformed configuration when its temperature exceeds the given temperature threshold;

said at least one mechanical member is an element made in a single piece by means of which the thermosensitive element, by reason of the deformation thereof, is capable of actuating the system for triggering the cut-off device;

said at least one member includes an element forming a mast mounted pivotally about an axis of rotation and upon which mast is arranged:

a triggering bar intended to cooperate with the system for triggering the cut-off device, said triggering bar extending in a substantially orthogonal direction relative to the axis of rotation of said mast; and a rigid vane offset radially relative to the axis of rotation of the mast, and said vane is arranged such that the thermosensitive member, under the influence of the deformation thereof, exerts an effort on the vane in order to cause the mast to pivot;

said at least one mechanical member includes a first member mounted movably and a second member mounted movably, on which a triggering bar is arranged, which is intended to cooperate with the system for triggering the cut-off device: the first member is held in a first position by being elastically biased against a stop-motion device and the thermosensitive member, by reason of the deformation thereof, is arranged so as to cause the first member of the stop-motion device to disengage when the thermosensitive member exceeds said given temperature threshold, the disengagement of the first member of the stop-motion device causing the first member to move beyond the stop-motion device via elastic biasing, the second member being coupled to the first member so that said movement of the first member results in movement of the second member capable of actuating the system for triggering the cut-off device;

in this last embodiment, the first member can be mounted pivotably or swivellably about an axis, the thermosensitive member being arranged so as to cause the disengagement of the first member from the stop-motion device by pivoting or swivelling the first member, said movement of the first member beyond the stop-motion device being a translational movement along the pivoting or swivelling axis of the first member; alternatively, said at least one mechanical member further includes a third member, the stop-motion device being arranged on the third member and the thermosensitive device being arranged so as to cause the disengagement of the first member from the stop-motion device by moving the third member; in these two alternatives, the second member is preferably mounted pivotably;

the device includes a locking system for locking said at least one mechanical member in an actuating position of the system for triggering the cut-off device when the thermosensitive member, by reason of the deformation thereof, has caused a movement of said at least one mechanical member capable of actuating the system for triggering the electrical cut-off device;

the locking system is provided via a hysteresis-type bistable deformation property of the thermosensitive member;

the locking system includes:

a stationary stop-motion device having two bearing faces which are substantially adjacent and orthogonal to one another; and an elastic tab arranged on said at least one mechanical member; the stop-motion device and the elastic tab being arranged such that:

the elastic tab is pre-stressed against the first bearing face when the thermosensitive member, by reason of the deformation thereof, has not yet caused a movement of said at least one mechanical member; and the elastic tab becomes irreversibly positioned against the second bearing face under the influence of the intrinsic return force of the elastic tab, once the thermosensitive member, by reason of the deformation thereof, has caused a movement of said at least one mechanical member capable of actuating the system for triggering the electrical cut-off device.

the at least one protection component includes a varistor and optionally a spark gap;

the thermosensitive member operates entirely thermomechanically;

the thermosensitive member is thermally connected by conduction with the protection component, either by direct contact with a surface of the protection component, or by means of an electrode of the thermosensitive member, the greater portion of the thermosensitive member preferably being arranged adjacent to main surface of the protection component;

the device includes a case housing the at least one protection component and the thermosensitive member, the case having a slot through which said at least one mechanical member protrudes from the case in order to cooperate with the system for triggering the cut-off device, when the cut-off device is arranged adjacent to the casing;

the device includes an electrical cut-off device having a triggering system, wherein:

said at least one mechanical member is arranged so as to cooperate with the system for triggering the electrical cut-off device; and the thermosensitive member and the at least one mechanical member are arranged such that, when the thermosensitive member exceeds said given temperature threshold, the thermosensitive member, by reason of the deformation thereof, causes said movement of said at least one mechanical member, said at least one mechanical member actuating the system for triggering the electrical cut-off device under the influence of said movement;

the device includes:

a first case housing said cut-off device; and a second case housing the at least one protection component and the thermosensitive member;

wherein:

the first case and the second case are preferably assembled removably;

the first case has a first slot providing access to the system for triggering the cut-off device; and the second case has a second slot through which the at least one mechanical member protrudes from the second case and penetrates into the first case via the first slot, in order to cooperate with the system for triggering the cut-off device.

the cut-off device and the protection component are electrically connected so that actuation of the system for triggering the cut-off device causes the electrical power supply to be cut off from the protection component;

the cut-off device is a magnetic circuit breaker or a thermomagnetic circuit breaker.

BRIEF DESCRIPTION OF THE DRAWINGS

Other characteristics and advantages of the invention will become apparent upon reading the following description of preferred embodiments of the invention, given for non-limiting illustrative purposes, and with reference to the appended drawing, in which.

FIG. *8a* shows a fifth embodiment of the functional portion of a protection module according to the invention, which makes use of fluid-filled deformable capsule, here shown at ambient temperature;

FIG. *8b* shows the functional portion of the FIG. *8a*, but in the triggering state;

FIGS. *9a* and *9b* are schematic representations of the condition of the fluid capsule of FIGS. *8a* and *8b* in the non-deformed and deformed state;

FIGS. 10 to 14 show an alternative to the third embodiment; and

Figure 15:
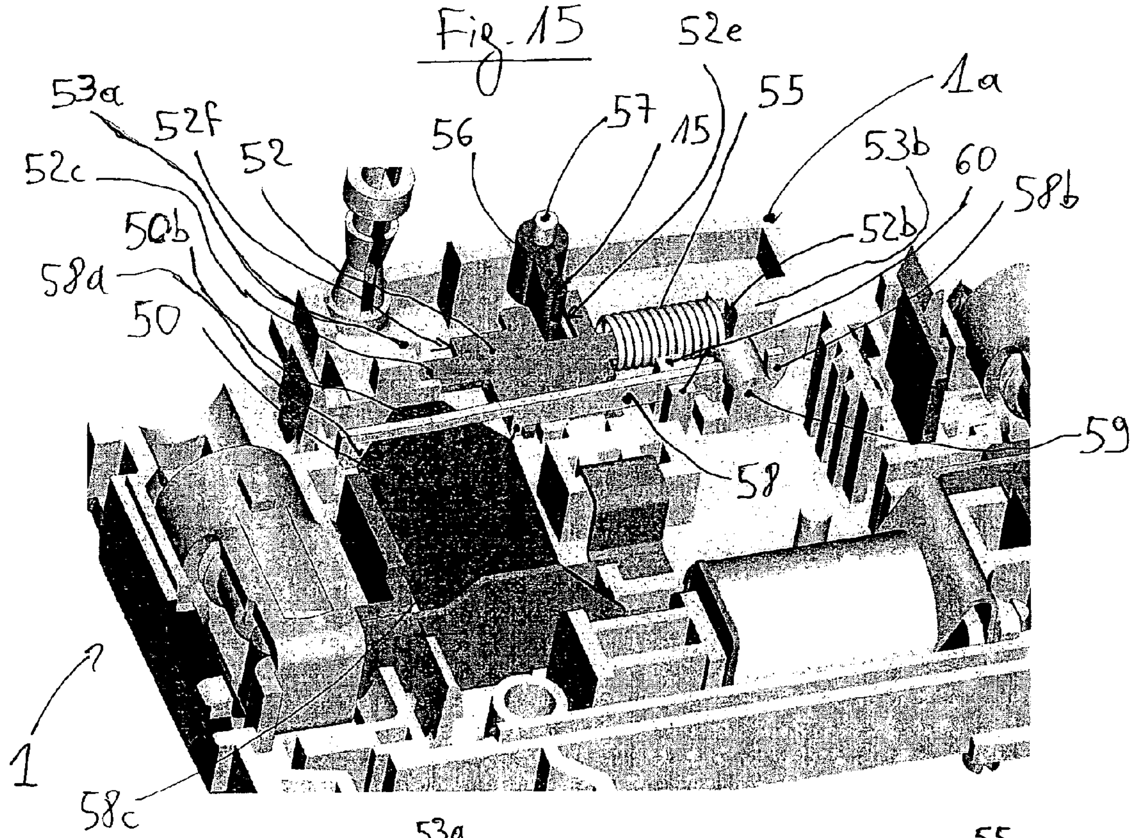
Figure 16:
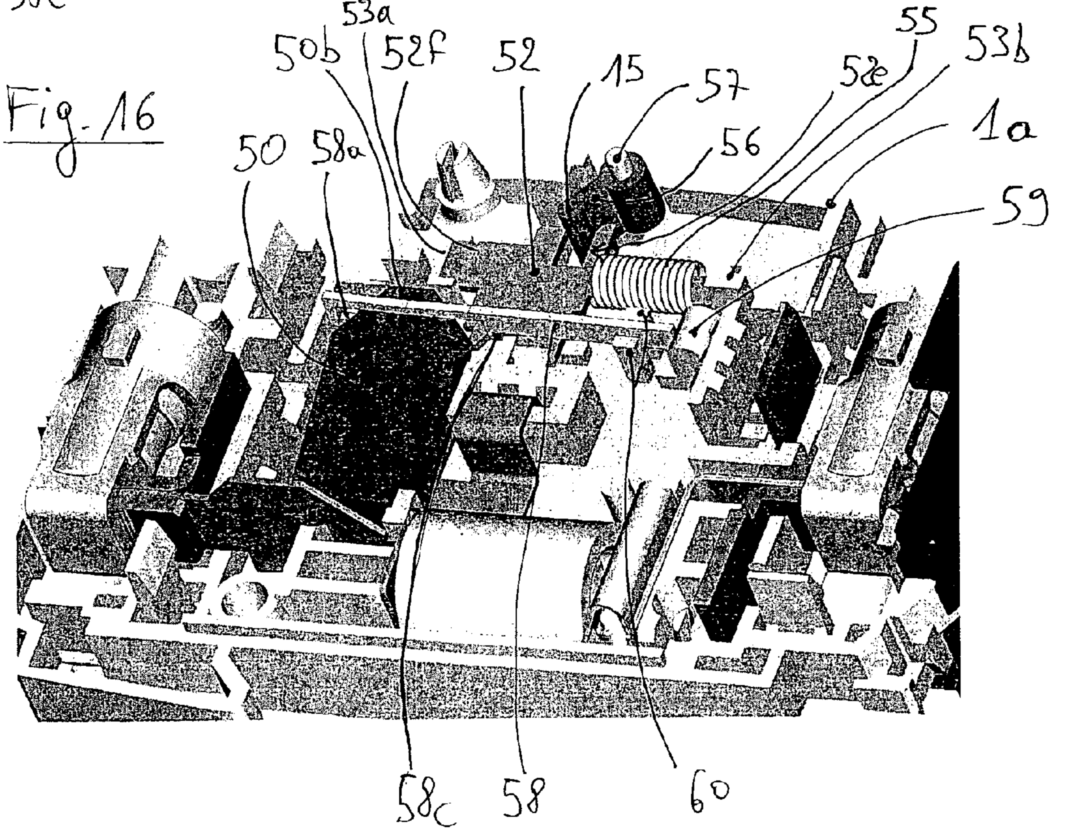

FIGS. 15 and 16 show another alternative to the third embodiment.

DETAILED DESCRIPTION OF ILLUSTRATIVE EMBODIMENTS

The device for protecting against overvoltages according to the invention includes at least one overvoltage protection component, preferably a varistor. It also includes a thermosensitive member capable of deforming dependent upon the temperature thereof. A thermal connection between the protection component and the thermosensitive member is obtained. This preferably involves a thermal conduction-type connection, but it can also involve a convection or radiation-type connection, or a combination of these or of two of them. In this way, in the event that the protection component overheats, the latter conducts the heat to the thermosensitive member. As a result, the temperature of the thermosensitive member rises along with that of the protection component.

In addition, the device includes at least one mechanical member which, in the one hand, is intended to cooperate with the thermosensitive member and which, on the other hand, is capable of cooperating with the system for triggering an electrical cut-off device, the purpose of said at least one mechanical member being to enable the thermosensitive member to actuate the system for triggering the cut-off device.

More precisely, the thermosensitive member and said at least one mechanical member are arranged such that, when the thermosenstive member exceeds a given temperature threshold, the latter, by reason of the deformation thereof, causes a movement of said at least one mechanical member, the movement of same being such that said at least one mechanical member is capable of actuating the system for triggering the electrical cut-off device. By actuating its triggering system, the cut-off device stops the flow of the electric current, i.e., the electrical contact or contacts thereof shift to the open state.

On the other hand, prior to the thermosensitive member undergoing this deformation, said at least one mechanical member is in a position which does not actuate the system for triggering the cut-off device. In this state, the cut-off device is operable, i.e., the electrical contact or contacts thereof are closed.

By appropriately choosing the aforesaid threshold temperature above which the thermosensitive member triggers the cut-off device, this device procures an effective and simple disconnection of the protection component or components, should the overheating of same be excessive and therefore dangerous. This temperature threshold is chosen to be higher than the temperature reached by the thermosensitive member when the device is operating under conditions considered to be normal, i.e., conditions in which the protection component acceptably ensures protection of the electrical installation to which the device is connected, and does so in complete safety, in particular without any overheating considered to be excessive. On the other hand, this temperature threshold is advantageously chosen to correspond to a temperature of the protection component considered to be abnormal, but preferably below a temperature level considered to be dangerous. Generally speaking, this temperature threshold is chosen so as to fulfil the safety requirements required by the applicable safety standards. This temperature threshold is preferably between 100° C. and 160° C., and more preferably between 135° C. and 140° C., which generally enables the applicable safety standard requirements to be met.

It thus suffices to couple the device of the invention with a cut-off device having an appropriate triggering system, by ensuring that said at least one mechanical member of the protection device cooperates with the triggering system, and by electrically connecting the protection device to the cut-off device so that the protection device is electrically powered by the electrical lines being protected by the cut-off device.

The protection device can include the cut-off device, optionally with the electrical connections therebetween already made. The protection device is then ready to be used by connecting to the electrical network being protected.

The device of the invention is particularly suitable for any overvoltage protection component which is capable of heating up in the event of a malfunction.

The device according to the invention is particularly simple and reliable. The fact of making use of a thermosensitive member capable of deforming dependent upon the temperature thereof, in order to detect the temperature of the protection component and to actuate the cut-off device, advantageously makes it possible to do without low-temperature welds. It also enables use to be made of commercially available standard cut-off devices such as circuit breakers, and to do so without any modification. In addition, the thermal connection between the thermosensitive member and the protection component can be implemented in a particularly simple and effective manner, in particular by positioning the thermosensitive member in proximity to the protection component, or even in direct contact therewith, or by means of an electrode of the protection component.

Figure 1:
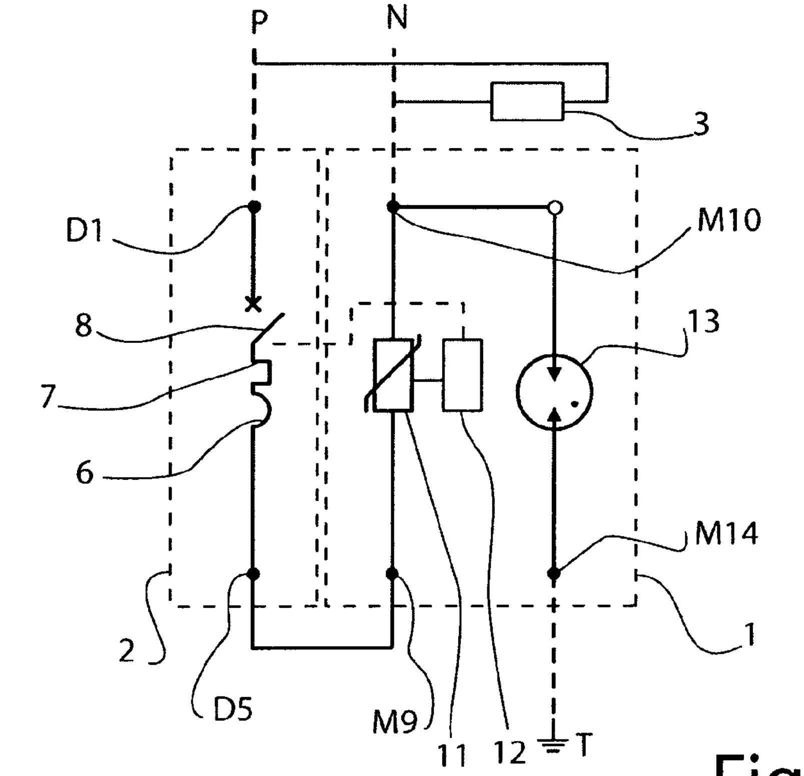
FIG. 1, shows by as a simplified electric scheme, the operation of a protection device according to the invention.

FIG. 1 shows a simplified wiring diagram of a protection device according to the invention. The device comprises a protection module 1 and an electrical cut-off device 2. The device is connected to an electrical network comprising a phase line P, a neutral line N and a ground line T.

The protection device is connected to the electrical network P, N with a parallel connection of a load 3. The latter diagrams an electrical installation that it is appropriate to power and protect, in particular against transitory overvoltages caused by a lightning strike or operational hazard with regard to the electrical network. The protection module 1 and the cut-off device 2 are preferably built into respective modular cases 1*a*, 2*a*, shown schematically in FIG. 2, prior to being stack-mounted and coupled to a track. Alternatively, the cases 1*a*, 2*a* are intended to be mechanically coupled together prior to being track-mounted.

The cut-off device 2, for example, is a standard thermomagnetic circuit breaker which, between an input terminal D1 and an output terminal D5, comprises, in series, a winding-type magnetic component 6, a bimetallic strip-type component 7, and isolating means of the isolating switch type 8. Preferably, the circuit breaker conventionally has a hand lever enabling resetting in the event of triggering. More generally speaking, the cut-off device 2 can be of any appropriate type having a mechanically actuatable system. The input terminal D1 is connected to phase P and the output terminal D5 is electrically connected to an input terminal M9 of the protection module 1. An output terminal M10 of the protection module 1 is connected to the neutral conductor N and is connected to the input terminal M9 by a protection component, preferably a varistor 11. The cut-off device 2 and the varistor 11 are therefore connected in series between phase P and the neutral conductor N.

According to the exemplary embodiment diagrammed in FIG. 1, the protection module 1 also comprises a spark gap 13 hooked up between the output terminal M10 and a second output terminal M14, connected to the neutral conductor N and ground T, respectively. The spark gap 13 is optional and can therefore be omitted.

The magnetic component 7 of the circuit breaker ensures protection against the short-circuits of the varistor 11 alone or simultaneously to the varistor 11 and the spark gap 13. Normally, the thermal component 7 ensures protection against the so-called overcurrents which perpetuate over time. However, as concerns the specific case of the thermal runaway of the varistor 11, protection is not provided by the thermal component 7 of the circuit breaker, because the leakage current of the varistor does not generally reach a sufficient degree of intensity to involve protection by the thermal component 7, or it is at least desirable to disconnect the varistor 11 from the electrical lines before the leakage current reaches such an intensity. In this case, it is the actuating means 12 described hereinbelow which, in particular, include the thermosensitive member that provides this protection. For this reason, the cut-off device can also be a magnetic circuit breaker without any thermal component, since the protection module 1, in cooperation with the circuit breaker, ensures the thermal protection function sufficiently. However, it may prove to be more economical to make use of a thermomagnetic circuit breaker, since exclusively magnetic circuit breakers are less common.

The protection module 1 comprises actuating means 12 intended to cooperate with a system or mechanism for triggering the cut-off device 2, more precisely the disconnecting means 8. These actuating means 12 are not part of the cut-off device 2, but are separate from it.

The actuating means 12 include the thermosensitive member, which includes a thermosensitive portion capable of deforming as a result of a rise in temperature of the varistor 11. To that end, the thermosensitive portion is thermally connected to the varistor 11.

The actuating means 12 also include at least one mechanical member capable of cooperating with the triggering mechanism of the cut-off device 2. When the temperature of same exceeds a given threshold, the thermosensitive member, by reason of the deformation thereof, actuates the triggering mechanism of the cut-off device 2, by means of this at least one mechanical member. In other words, due to its change in geometry, the thermosensitive member itself acts on the triggering mechanism via this at least one mechanical member. The function of this at least one mechanical member is to transmit, and, if need be, adapt the movement of the thermosensitive member, generated as a result of the deformation thereof, to the triggering mechanism of the cut-off device 2, in order to actuate same.

Figure 2:
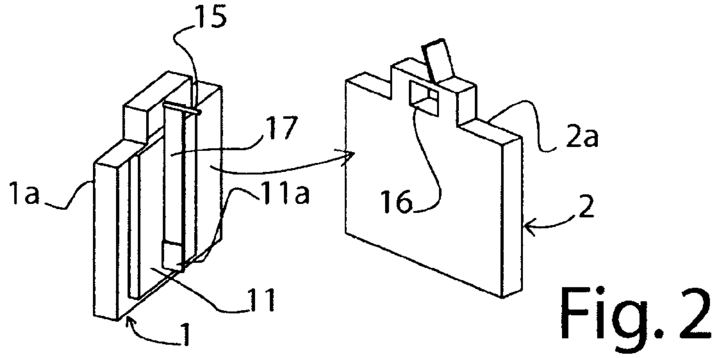
FIG. 2 is a schematic representation of the assembly of a protection device according to the invention, which comprises a cut-off device and a protection module intended to be assembled, the functional portion of the protection module according to a first embodiment being shown clearly.

In the preferred embodiment, this at least one mechanical member comprises a triggering bar 15, which protrudes laterally from the modular case 1*a*, as shown in FIG. 2, preferably through a slot (not shown), which is made in the case 1*a*. This triggering bar 15 is intended to be inserted into an opening 16 made in the modular case 2*a*, in order to cooperate with the triggering mechanism of the cut-off device 2. From this standpoint, the cut-off device 2 is advantageously a standard, commercially available circuit breaker of the type having such an opening 16 for a mechanical control switch.

The thermosensitive member can be of any suitable type, such as a bimetallic strip, heat-retractable element or deformable capsule deforming under the influence of a fluid that it contains. In the embodiments described hereinbelow, the varistor 11 has a substantially flattened parallelepiped shape with two principal faces, as concerns the surface area thereof. The flattened nature of the varistor is advantageous from the standpoint of the overall dimensions thereof, however it might also be of a different shape.

In the embodiment of FIG. 2, the thermosensitive member is a bimetallic strip 17. The bimetallic strip 17 is in the form of a blade in state not deformed by overheating. The bimetallic strip 17 is mounted via one end on a connecting electrode 11*a* of the varistor 11. This electrode 11*a* protrudes perpendicularly to one the principal faces of the varistor 11. The bimetallic strip 17 is attached to the electrode 11*a* by any appropriate means, in particular by a cold assembly method such as crimping or riveting or else by welding. The triggering bar 15 is attached to the opposite end of the bimetallic strip 17. Alternatively, the triggering bar 15 is made integral with the bimetallic strip 17. As can be seen in FIG. 2, the bimetallic strip 17 extends along the principal face of the varistor 11, which limits the overall dimensions and also ensures a thermal connection via convection, or even via radiation. However, the bimetallic strip 17 is thermally connected to the varistor 11 above all via thermal conduction by means of the electrode 11*a*. When the temperature of the bimetallic strip 17 rises above a given threshold, it bends, thereby causing the upper end thereof bearing the triggering bar 15 to move along the principal face of the varistor 11. Correspondingly, the triggering bar 15 actuates the triggering mechanism of the cut-off device 2 when the protection module 1 and the cut-off device 2 are coupled together.

Figure 3:
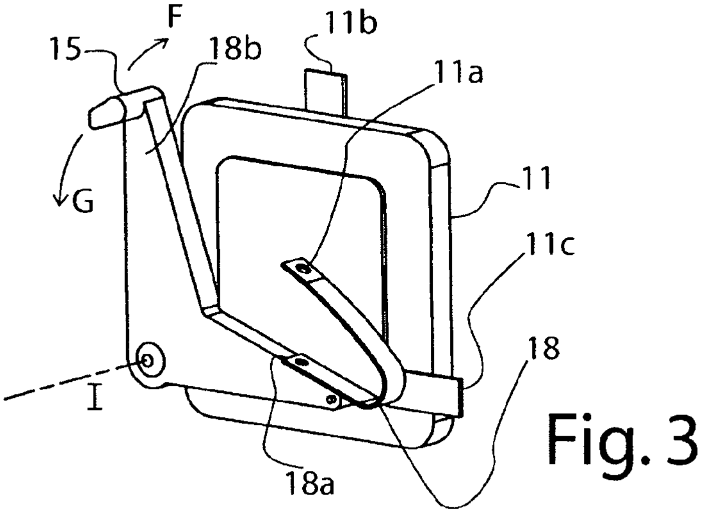
FIG. 3 shows a second embodiment of the functional portion of a protection module according to the invention.

FIG. 3 shows another embodiment of the actuating means 12 with a varistor. The thermosensitive member is a bimetallic strip 18. In a state not deformed by overheating, the bimetallic strip 18 has the shape of a curved or pre-stressed blade during the mounting of same inside the case 1*a*. This is the shape of the bimetallic strip 18 in the normal operating conditions of the device. One end of the bimetallic strip 18 is attached to a connecting electrode 11*a* of the varistor 11, which electrode 11*a* protrudes from a principal face of the varistor 11, as described with respect to the embodiment of FIG. 2. As can be seen, the varistor 11 has two other electrodes 11*b*, 11*c* for connecting the protection module 1 to terminals M9, M10.

The opposite end 18*a* of the bimetallic strip 18 bears against the end of an arm 18*b*. The arm 18*b* is mounted pivotably about an axis perpendicular to the principal surface of the varistor 11, in other words, a horizontal axis in the representation of FIG. 3. The arm 18*b* bears the triggering bar 15. The possible movements of the triggering bar 15, based on the deformation of the bimetallic strip 18, also occur along the principal face of the varistor 11, as referenced by the arrows F and G. In the event of a deformation due to the rise in its temperature, the bimetallic strip 18 tends to open, in other words, the end 18*a* thereof moves downward in FIG. 3, and therefore causes the arm 18*b* to rotate in the direction of arrow F.

The movement of the bimetallic strip 17 or 18 along the principal face of the varistor 11, in the embodiments of FIGS. 2 and 3, is also advantageous from the viewpoint of the overall dimensions of the device.

Figure 4:
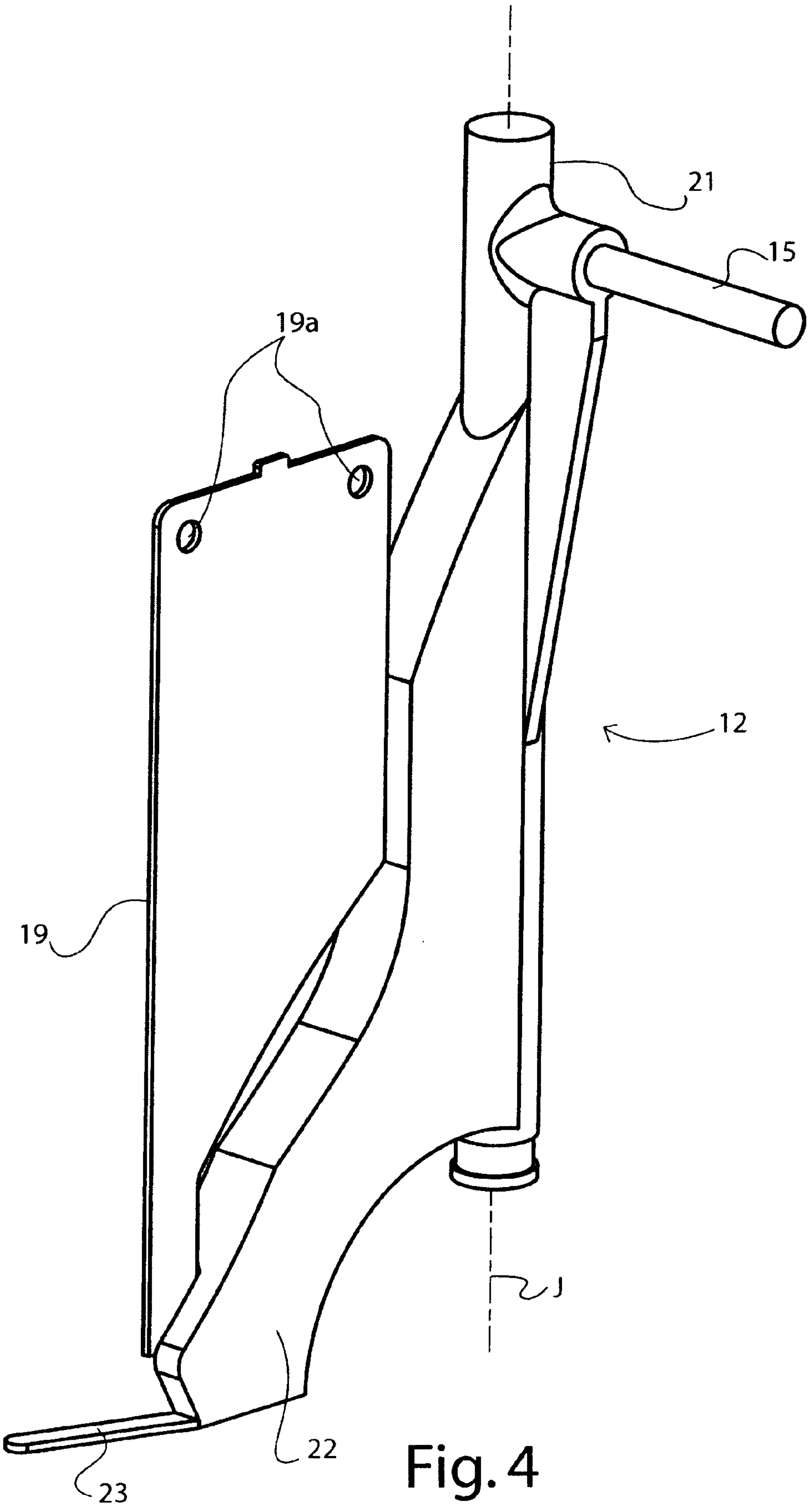
FIG. 4 shows a third embodiment of the functional portion of a protection module according to the invention.
Figure 5:
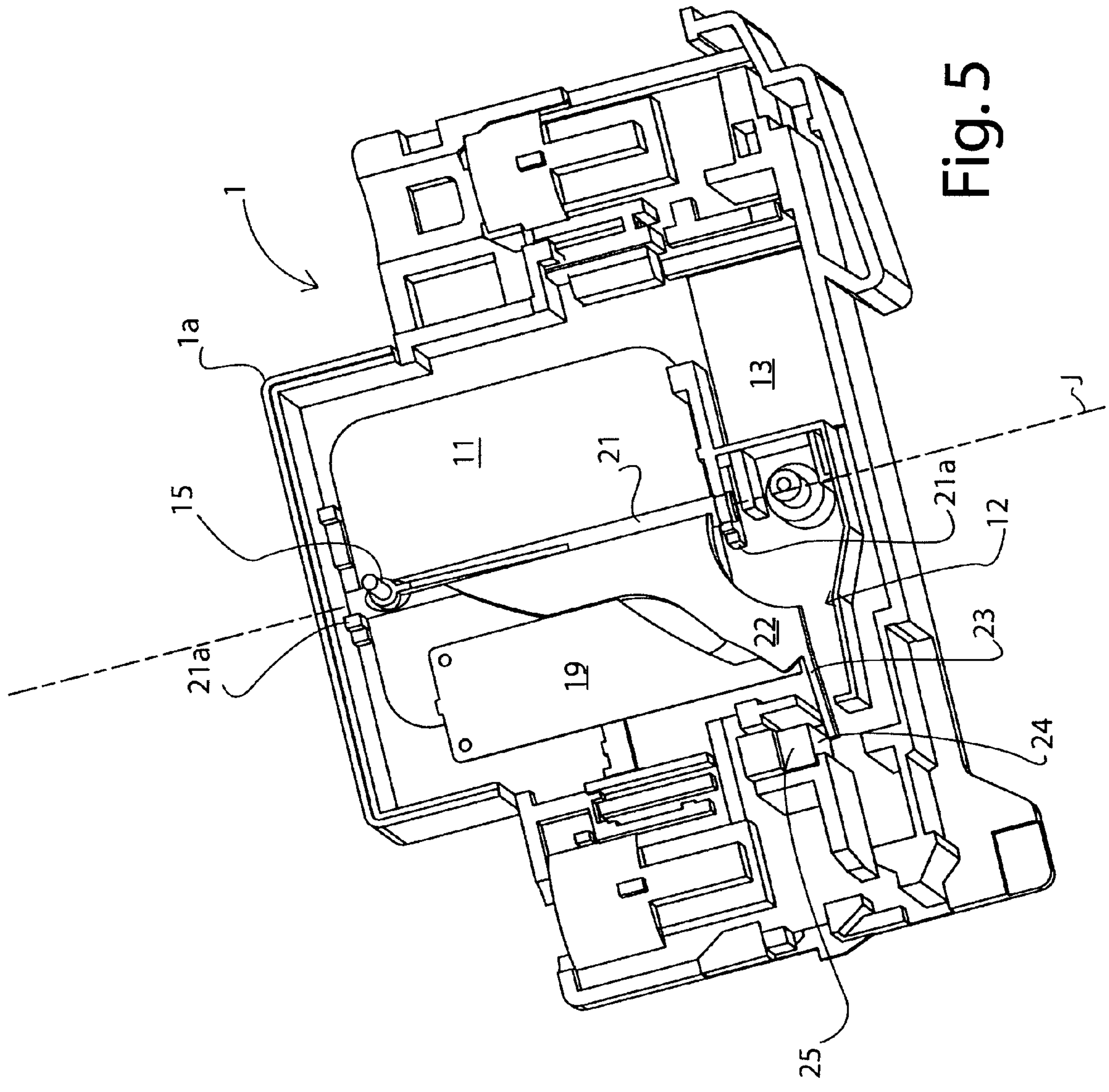
FIG. 5 shows the interior of a protection module comprising the functional portion of FIG. 4, with the functional portion in a non-triggered position of the associated cut-off device.
Figure 6:
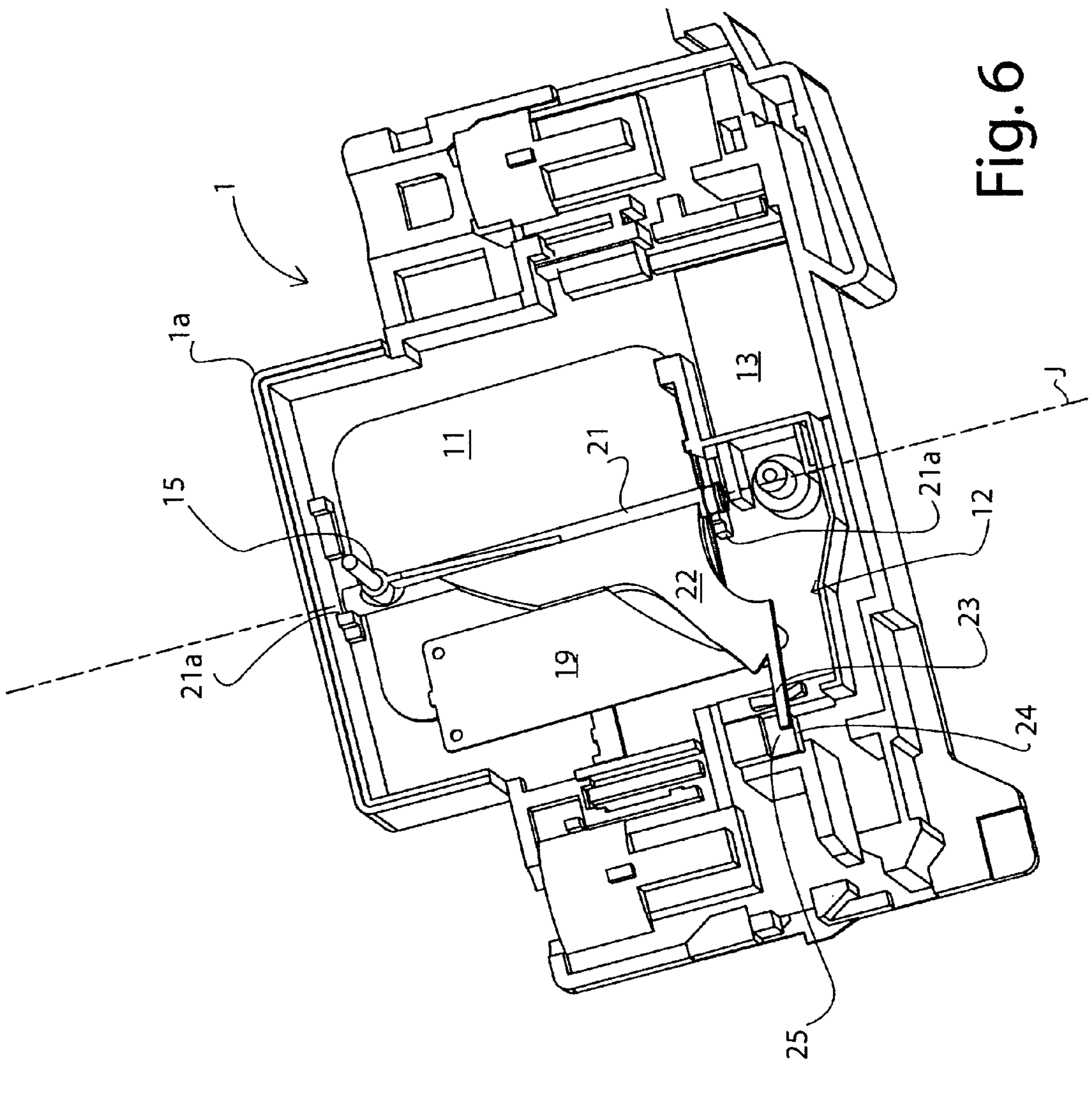
FIG. 6 shows the interior of the protection module comprising the functional portion of FIG. 4, with the functional portion in a triggered position of the associated cut-off device.

FIG. 4 shows yet another embodiment of the actuating means 12 implemented in the device shown in FIGS. 5 and 6. The actuating means 12 include a bimetallic strip 19 having the shape of a parallelepiped plate in the non-deformed state. The bimetallic strip 19 is attached in an end region, in this case in the upper portion thereof, to a principal face of the varistor 11. More precisely, the bimetallic strip 19 is attached to an electrode of the varistor 11 arranged on the principal surface thereof. The attachment of the bimetallic strip 19 to the electrode can be made by any appropriate means, such as my riveting through holes 19*a* in the bimetallic strip 19. Here again, the bimetallic strip 19 is thermally connected to the varistor 11 substantially via conduction between the bimetallic strip 19 and the electrode of the varistor, but also via convection or radiation. Under the effects of temperature, the bimetallic strip 19 deforms in the portion opposite the end region by which it is attached to the varistor 11.

The movement generated by the bimetallic strip 19, by reason of the deformation thereof, is, in this case, transmitted to the triggering mechanism of the cut-off device 2, owing to a tripping mechanism. More particularly, this involves a one-piece tripping mechanism. A portion of the tripper forms a mast 21 mounted pivotably inside the case 1*a*. The lower and upper ends of the mast 21 are housed inside bearings 21*a* shown in FIGS. 5 and 6. The triggering bar 15 is arranged on the mast 21 and extends along a longitudinal direction which is substantially orthogonal in relation to the axis of rotation J of the mast 21. Similarly to the embodiment of FIG. 2, the triggering bar 15 protrudes from the case 1*a* through a slot therein and penetrates into a slot 16 of the case 2*a*, in order to cooperate with the triggering mechanism of the cut-off device 2, when the protection module 1 and the cut-off device 2 are assembled. The connection between the lower and upper ends of the mast 21 and the bearings 21*a* can simply be a pin or alternative a sliding pin, in particular if the triggering mechanism of the circuit breaker requires a combined pivoting and translating movement of the triggering bar 15 during actuation thereof. The mast 21 further comprises a rigid vane 22 of which the plane of extension containing the axis of rotation J is substantially orthogonal to the longitudinal direction of the triggering bar 15. The end portion of the bimetallic strip 19, which is opposite the region of attachment thereof to the varistor 11, in this case the lower portion, is situated in the area of the vane 22. In the event that the bimetallic strip 19 deforms, this end portion moves away from the varistor 11 and exerts an effort on the rigid vane 22. This stress is exerted on a portion of the rigid vane 22 which is offset in relation to the axis of rotation J, the effect of which is to pivot the mast 21. For this purpose, the bimetallic strip 19 is in mechanical contact with and preferably bears freely against the rigid vane 22. The triggering bar 15 rotates about the axis J with the pivoting of the mast 21, the effect of which is to actuate the triggering mechanism of the cut-off device 2.

The mast 21, the triggering bar 15 and the rigid vane 22 can be made in a single piece, e.g., via injection of a synthetic material, which results in a production and assembly savings.

The fact that the mast 21 works in rotation, due to the pin or sliding pin connection, is advantageous, because guiding in rotation is simple to implement and particularly reliable, unlike guiding purely in translation, involving, in particular, a plastic part.

It is advantageous to provide for a locking system for locking the actuating means 12 in the triggering position when they have caused the disconnecting switch 8 to open in response to overheating of the protection component. Consequently, a user cannot reset the electrical cut-off device 2 by means of the reset lever thereof.

In this embodiment, the locking system includes an elastic tab 23, which is integral with the rigid vane 22. The elastic tab 23, for example, is a reduced-size extension of the bottom portion of the rigid vane 22. The dimensions of the elastic tab 23 are chosen so as to give same an appropriate degree of elasticity, taking into account the material comprising the rigid vane 22. Alternatively, the elastic tab 23 is added on and attached to the rigid vane 22 by any appropriate means.

The locking system likewise includes a stationary stop-motion device integral with the case 1*a* and having a first bearing face 24 and a second bearing face 25 for the elastic tab 23. The latter is pre-stressed against the first bearing face 24 while imposing a downward bending thereupon during mounting of the tripper inside the case 1*a*. Such an arrangement is shown in FIG. 5 and corresponds to a non-triggering position of the triggering rod 15, i.e., to the protection module 1 being electrically powered.

When an excessively strong leakage current passes through the varistor 11 at the end-of-life, the thermal energy released by the varistor 11 causes sufficient overheating of the bimetallic strip 19 to cause the deformation of same. As mentioned previously, by deforming, the bottom end of the bimetallic strip 19 bend and moves away from the varistor 11 while raising the rigid vane 22. The bimetallic strip 19 pushes the mast 21 in a rotating motion into the triggering position thereof. The triggering bar 15 then actuates the triggering mechanism of the disconnecting switch 8 in the case 2*a*. The protection module 1 is then insulated from the electrical power supply. The rotation of the mast 21, over a course determined by the deformation of the bimetallic strip 19, likewise drives the elastic tab 23 in a rotating movement, which, by reason of the elasticity thereof, becomes positioned on the second bearing face 25. The second bearing face 25 is preferably adjacent and substantially perpendicular to the first bearing face 24. This second bearing face 25 serves as a stop-motion device for the elastic tab 23, as shown in FIG. 6. By abutting against this second bearing face 25, the elastic tab 23 prevents the mast 21 from pivoting in the opposite direction, in order to re-assume the initial position thereof, as shown in FIG. 5. This results in an irreversible positioning of the mast 21 in its position for triggering the cut-off device 2, even if, after cooling, the bimetallic strip 19 re-assumed the initial position thereof prior to deformation. The design of the stationary stop-motion device and the elastic tab 23 takes account, where appropriate, of the translational movement component of the mast 21, in the case where the connection between the mast 21 and the bearings 21*a* is a sliding pin intended to enable the movement bar 15 to follow a path imposed by the triggering mechanism of the circuit breaker, requiring a combined rotational and translational movement of the triggering bar 15.

The irreversible positioning of the mast 21 in the triggering position thereof is obtained owing to the intrinsic return force of the elastic tab 23, thereby bringing said tab back upward into a position in abutment against the second bearing face 25. Insofar as the triggering bar 15 remains in the triggering position thereof, the cut-off device 2 cannot be reset by means of a manual or automatic control. The user is then informed, at least visually, by the triggering position of the actuating lever of the circuit breaker, of a faulty operating condition of the protection module 1. An unsuccessful attempt at resetting further provides the user with sensory and, more particularly, tactile information indicating to same that the protection module is not operational.

According to a preferred alternative embodiment, the thermosensitive member, and more particularly the bimetallic strip 19, has a bistable deformation property, giving same a stable non-deformed configuration in the absence of any overheating of the varistor 11, as well as a stable deformed configuration in response to a given overheating of the varistor 11.

The bistable characteristic of the thermosensitive member and in particular that of the bimetallic strip, is advantageous both because of the accuracy concerning the temperature at which it deforms and because of the sudden nature of the temperature-dependent deformation thereof, whereas, in the same way as an element made of a heat-retractable material, the deformation of a conventional bimetallic strip is gradual and less precise, sometimes possibly requiring means of adjustment in order to tare same.

Such a bimetallic strip 19 having bistable deformation can advantageously itself obtain locking of the actuating means 12 in the triggering position, when they have caused the disconnecting switch 8 to open. The locking system formed by the elastic tab 23 and the bearing face 25 forming a stop-motion device can be omitted in this case. To that end, the material comprising the bimetallic strip 19 can be chosen such that the temperature-dependent deformation cycle thereof has hysteresis. More precisely, the transition from the non-deformed conformation to the deformed conformation occurs at a temperature greater than ambient or normal operating temperature, preferably between 100° C. and 160° C., and more preferably between 135° C. and 140° C., while the return from the deformed conformation to the non-deformed conformation can only occur at a temperature substantially lower than the ambient temperature, and preferably between −20° C. and −40° C. In this way, the bimetallic strip 19 remains in the deformed state despite a return to ambient temperature, and, for this reason, the bimetallic strip 19 holds the mast 21 in the triggering position of the cut-off device 2. The appropriate transition temperatures can be obtained by the pre-stressed state induced by a specific shaping of the bimetallic strip 19.

However, it is possible to ensure locking of the actuating means 12 other than by means of the bistable hysteresis nature of the thermosenstive member, in particular by the locking system consisting of the elastic tab 23 and the bearing face 25 forming a stop-motion device.

A locking system having the same function can also be provided for in the embodiments of FIGS. 2 and 3. As concerns FIG. 2, a stop-motion device, not shown, which is retractable pivotably or by reason of the elasticity thereof, can be arranged inside the case 1*a* in order to cooperate with the triggering bar 15 or an upper end portion of the bimetallic strip 17. The triggering bar 15 or the end portion of the bimetallic strip 17 pushes the stop-motion device back and passes beyond the stop-motion device in the event of a deformation of the bimetallic strip 17. However, moving in reverse, the triggering bar 15 or the end portion of the bimetallic strip 17 once again bears against the pivoting stop-motion device, which is locked in this direction over a fixed portion of the case, in order to prevent the return of the bimetallic strip 17. As concerns FIG. 3, a catch-like system can be provided on the axis of rotation I, in order to prevent backward pivoting of arm 18*b*, in the direction of arrow G.

Figure 10:
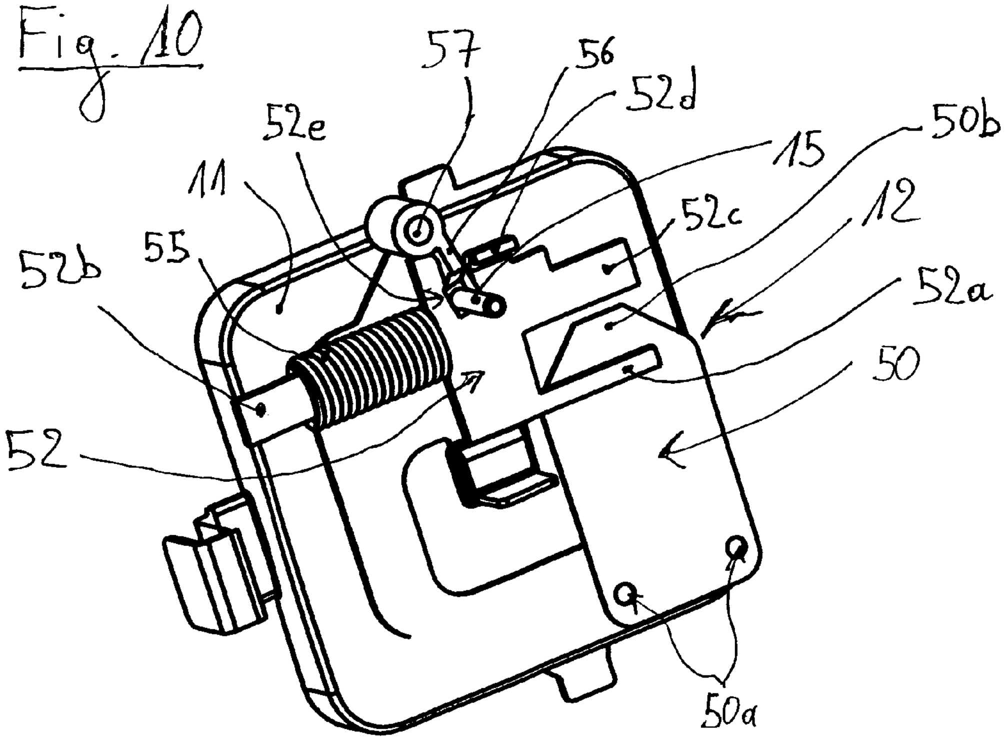
Figure 11:
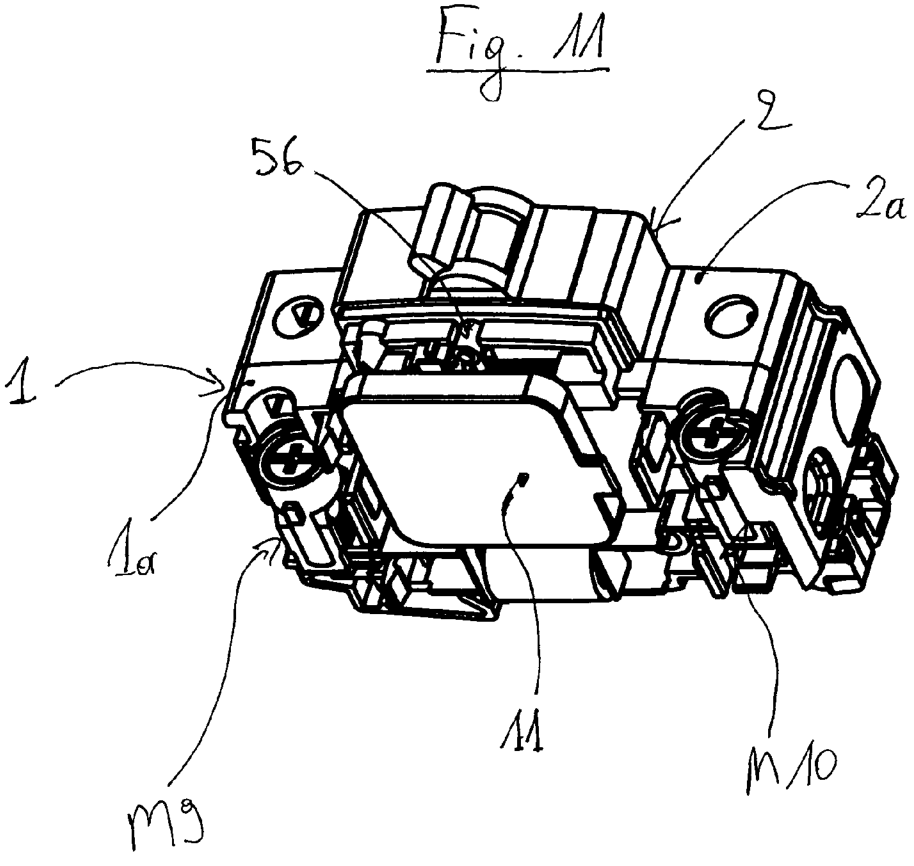
Figure 12:
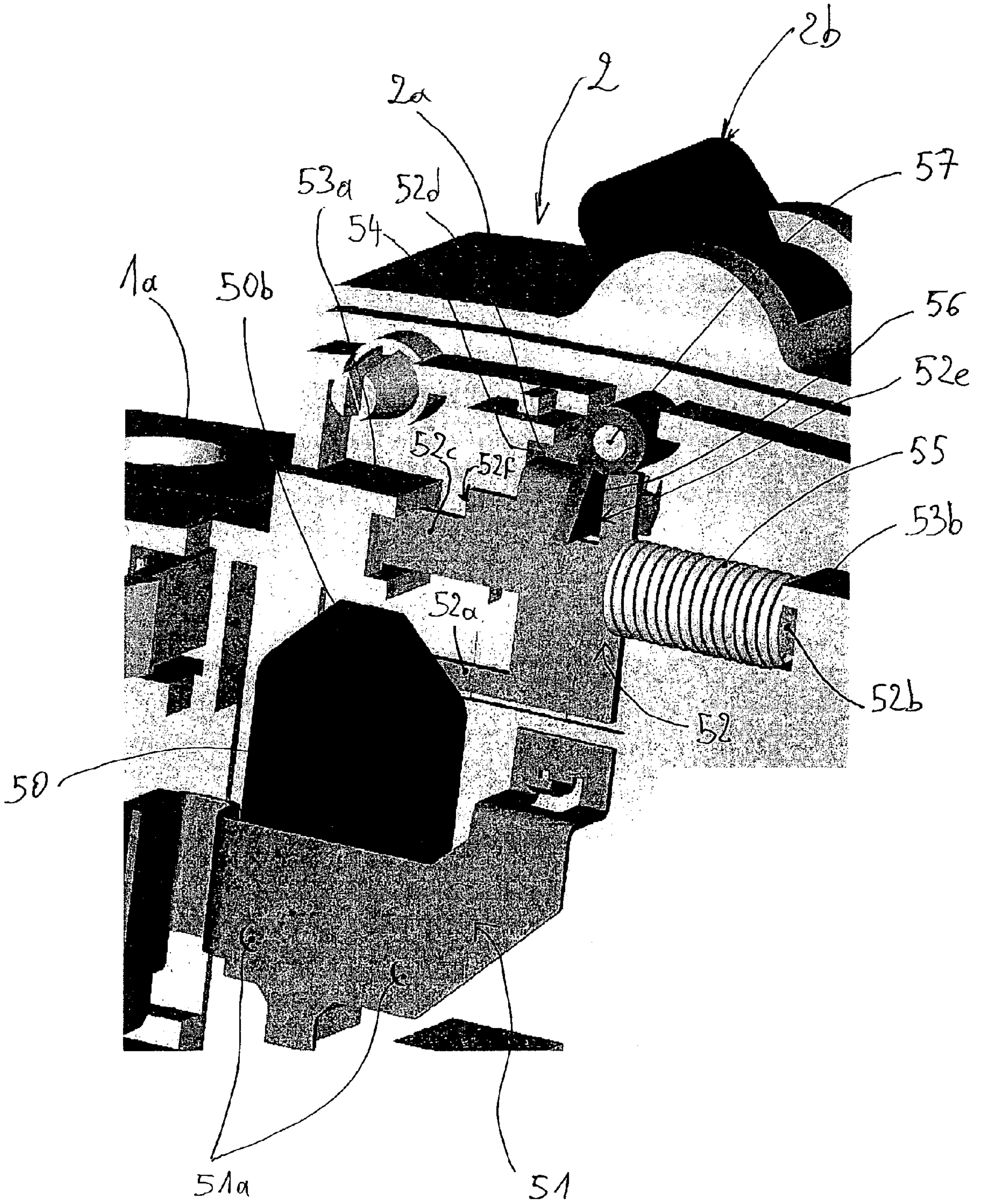
Figure 13:
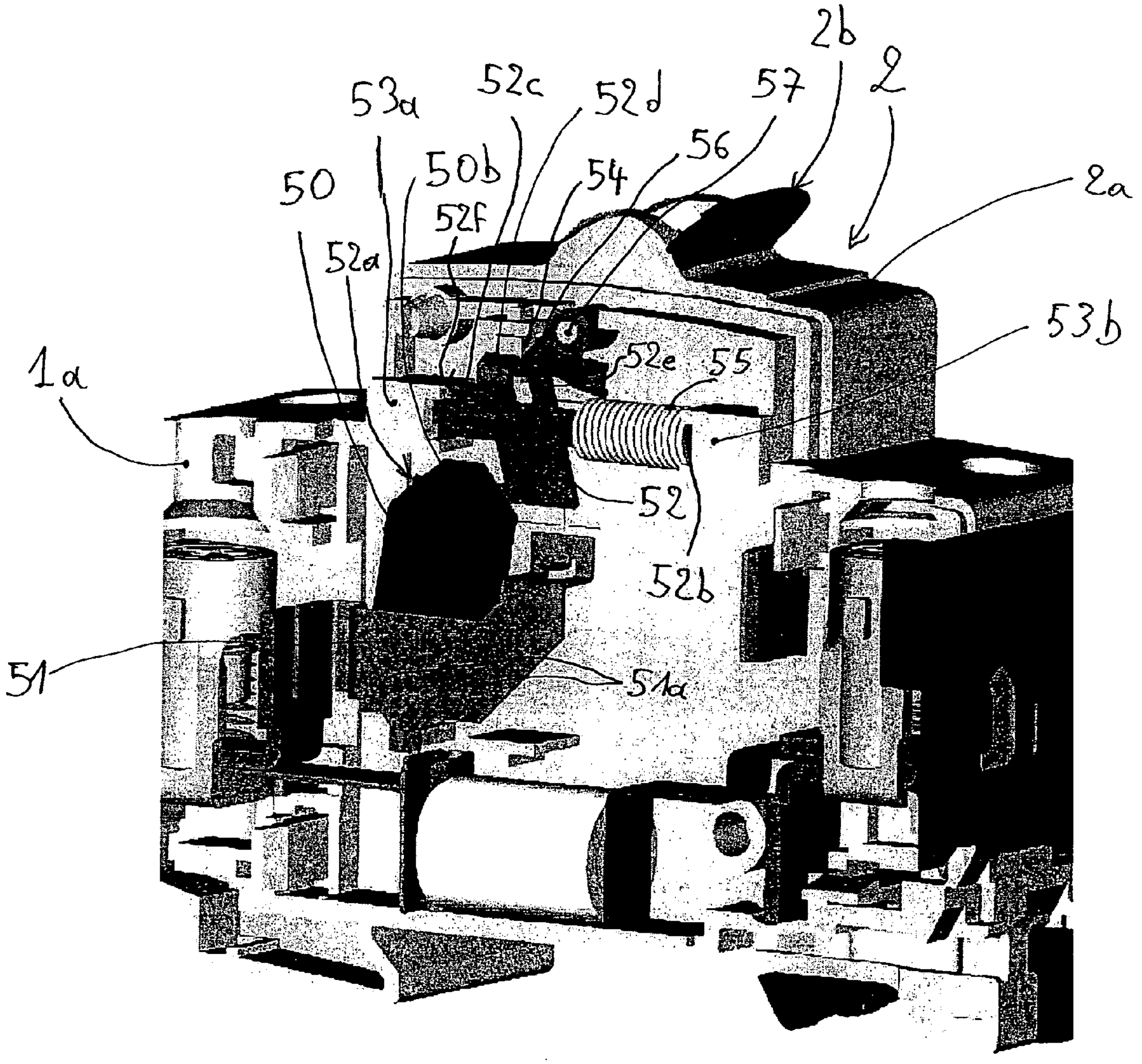
Figure 14:
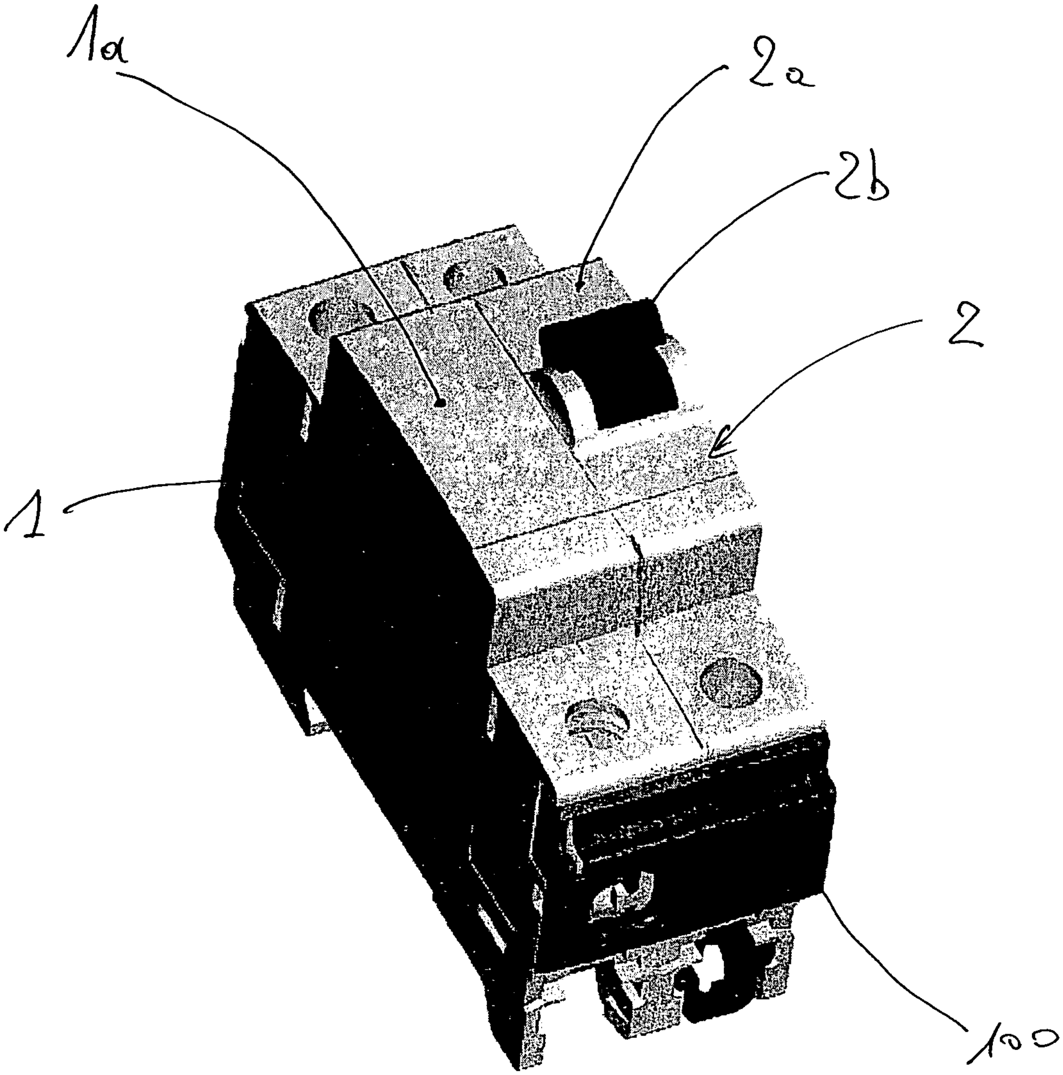

FIGS. 10 to 14 show another embodiment which comprises an alternative to the one just described in connection with FIGS. 4 to 6. FIG. 14 is an overall view of the protection module 1 mechanically coupled to a ct-off device 2 by two snap-on parts 100 (one being behind and invisible). FIG. 10 shows the actuating means 12 and the variable-voltage resistor 11, without showing the rest of the overvoltage protection device, or the associated cut-off device. FIG. 11 shows the protection module 1 mechanically coupled to the cut-off device 2, which has its own case 2*a*. The description of the cut-off device 2 provided within the scope of the embodiments of FIGS. 4 to 6 similarly applies to this embodiment. In the example shown, it is a matter of a conventional magnetic or thermomagnetic circuit breaker. In this embodiment, the case 1*a* of the protection module 1 consists of two shells assembled together, but the shell distant from the cut-off device 2 is not shown in order to show the arrangement of the components inside the case 1*a*.

Similarly to the embodiment of FIGS. 4 to 6, the actuating means 12 include a bimetallic strip 50. The shape of the bimetallic strip 50 is rectangular, except for the free end thereof, which is in the shape of a trapezoid. As concerns the mechanical attachment and operation thereof, the description of the bimetallic strip 19 and the operation thereof, particularly under the effects of the heat conveyed to same by the varistor 11, and within the scope of the embodiment of FIGS. 4 to 6, is also applicable to this embodiment, and therefore will not be repeated here.

FIG. 12 shows the protection module 1 without the cut-off device 2, but once again with the same shell, not shown so as to show the components of the protection device. In FIG. 12, the protection module 1 is shown in the non-triggered state, in other words, when the bimetallic strip 50 has not yet caused the cut-off device 2 to be triggered. FIG. 13 is similar to FIG. 12, but at a smaller scale, and shows the protection device in the triggered state, in other words, when the bimetallic strip 50 has caused the cut-off device 2 to trigger by reason of the deformation thereof due to the increase in the temperature of same above a given threshold. In FIGS. 12 and 13, the varistor 11 is no longer visible, so as to depict the mechanism transmitting the movement of the bimetallic strip 50 to the cut-off device 2. On the other hand, visible therein is the electrode 51 of the varistor 50 to which the electrode is riveted 51*a* to the varistor 50 through the holes 50*a* visible in FIG. 10.

As in the embodiment of FIGS. 4 to 6, the actuating means 12 also include a mechanism for transmitting the movement of the free end 50*b* of the bimetallic strip 50, by reason of the deformation thereof due to the increase in the temperature thereof, to the triggering mechanism of the cut-off device 2. However this mechanism is different from that of the embodiment of FIGS. 4 to 6. It is particularly visible in FIGS. 10, 12 and 13, whereas it is not visible in FIG. 11, due to the fact that it is placed between the varistor 50 and the cut-off device 2.

This mechanism includes a vane 52 mounted pivotably or swivellably inside the case 1*a*, which, in the example shown, is produced by the fact that the vane 52 has two opposing arms 52*b* and 52*c*, the ends of which are each received into a seat formed in a respective protuberance 53*a*, 53*b* moulded integral with the case 1*a*. The two arms 52*b* and 52*c* therefore define a pivoting or tilting axis for the vane 52. In addition, the vane 52 includes an arm 52*a*, which is radially offset relative to the tilting axis. The arm 52*a* is positioned at the free end 50*b* of the bimetallic strip 50 so that the free end 50*b* stresses the arm 52*a* in the event that the bimetallic strip 50 is deformed due to the overheating thereof.

The vane 52 includes a bearing pad 52*d*, which is provided so as to come into axial abutment with an abutment surface arranged on the case 1*a*. In the example shown, the abutment surface 54 is made on a protuberance moulded integral with the case 1*a*. The vane 52 is elastically stressed along the pivoting or tilting axis of the vane 52 in order to press the bearing pad 52*d* against the abutment surface 54. In this case, the vane 52 is elastically stressed by a helical spring 55 positioned around the arm 52*b* of the vane 52 and which, at one end, bears against the protuberance 53*b* of the case 1*a*, and at the other end thereof, against the vane 52.

The vane 52 also includes a notch 52*e* into which the free end of a trigger-gate forming arm 56 is inserted, which is mounted pivotably in the case 1*a* by the other end thereof. In the example shown, the trigger-gate 56 is mounted pivotably about an axis 57 moulded integral with the case 1*a*. The triggering bar 15 is arranged at the free end of the trigger-gate forming arm 56, and is provided so as to cooperate with the triggering mechanism of the cut-off device 2, while protruding from the case 1*a* through a slot (not shown) made therein.

During normal operation, the protection module 1 is in the state shown in FIG. 12. When the leakage current of the varistor 11 increases abnormally, and when it causes significant overheating of the varistor 11, this overheating causes an increase in temperature of the bimetallic strip 50 sufficient to cause the deformation thereof, the effect of which is to move the end thereof 50*b* while separating same from the varistor 11. The end 50*b* of the bimetallic strip 50 then presses on the arm 52*a* of the vane 52, the effect of which is to make same pivot or tilt about the pivoting or tilting axis thereof. This pivoting or tilting has the effect of releasing the bearing pad 52*d* from the stop-motion surface 54. Under the influence of the elastic stress to which it is subjected, namely by the spring 55 in our example, the vane 52 is then moved along the pivoting or tilting axis until the vane 52, by way of a bearing edge 52*f*, abuts against the protuberance 53*a* of the case 1*a*. In its movement, the vane 52 pivots the trigger-gate 56 about the axis thereof 57. As a result, the triggering bar 15 is moved, the effect of which is to actuate the triggering mechanism of the cut-off device 2. Consequently, the varistor 11 is disconnected from the electrical power lines of the installation. This situation is shown in FIG. 13, wherein it is seen that, unlike in FIG. 12, the reset lever 2*b* of the circuit breaker is lowered.

After the cut-off device 2 has been triggered by the actuating means 12, it is impossible for a user to manually reset the cut-off device by means of the reset lever thereof 2*b*. As a matter of fact, the triggering bar 15 is held in the triggering position as a result of the elastic stress of the vane 2 against the protuberance 53*a* of the case 1*a*.

FIGS. 15 and 16 show an alternative to the protection module 1 described in connection with FIGS. 10 to 14. The outward appearance of the protection module 1 with the associated cut-off device 2 thereof is identical to that shown in FIG. 14. The entire description of the embodiment of FIGS. 10 to 14 is applicable to this alternative, except for certain modifications in the actuating means 12, which will be described hereinbelow. It likewise includes a bimetallic strip 50 similar to that of the embodiment of FIGS. 10 to 14.

In FIG. 15, the protection module 1 is shown in the non-triggered state, in other words, when the bimetallic strip 50 has not yet caused the cut-off device 2 to be triggered. FIG. 16 is similar to FIG. 15, but shows the protection module 1 in the triggered state, in other words, when the bimetallic strip 50 has caused the associated cut-off device 2 to be triggered, by reason of the deformation thereof, as a result of the rise in temperature thereof above a given threshold. In FIGS. 15 and 16, the varistor 11 is no longer shown so as to display the mechanism transmitting the movement of the bimetallic strip 50 to the cut-off device 2. The varistor 11 is arranged inside the case 1*a* similarly to the embodiment of FIGS. 10 to 14.

The actuating means 12 include a rod 58 which is hinged at one end 58*b* to the case 1*a*. In the example shown, the rod 58 has a hook shape at the end thereof 58*b* which is inserted into a through-hole made in a protuberance 59 optionally moulded integral with the case 1*a*. The rod is further inserted into a groove defined by two protuberances 60 also optionally moulded integral with the case 1*a*.

The other end of the rod 58 passes in the vicinity of the free end 50*b* of the bimetallic strip 50. This end of the rod 58 has a return 58*a* running from the opposite end of the bimetallic strip 50 Consequently, the rod 58, in this case, is linked with play to the end 50*b* of the bimetallic strip 50. The vane 52 has modifications with respect to the embodiment of FIGS. 10 to 14. In this embodiment, the vane 52 is not pivotably or swivellably mounted, but moves laterally only, i.e., in the direction of the axis defined by the arms 52*b* and 52*c*, whereby the vane is held on the protuberances 53*b* and 53*c* of the case 1*a*. The vane 52 is elastically stressed in the direction of the axis defined by the arms 52*b* and 52*c*, e.g., by a helical spring 55, as in the case of the embodiment of FIGS. 10 to 14. In normal operating position, the vane 52 is not in abutment against the protuberance 53*a* of the case 1*a*, but against as setback 58*c* of the rod 58. It is therefore the rod 58 which holds the axial position of the vane 52. This situation can be seen in FIG. 15. In addition, as in the embodiment of FIGS. 10 to 14, the vane 52 has a notch 52*e*, which cooperates with a lever 56 bearing the triggering bar 15.

When the leakage current of the varistor 11 increases abnormally and causes significant overheating of the varistor 11, this overheating causes a rise in temperature of the bimetallic strip 50 which is sufficient to cause the deformation thereof, the effect of which is to move the end thereof 50*b*. Unlike the embodiment of FIGS. 10 to 14, the deformation of the bimetallic strip 50 causes the end 50*b* of the varistor 11 to draw close. The end 50*b* of the bimetallic strip 50 then raises the corresponding end of the rod 58, the effect of which is to release the vane 52 from the setback 58*b* of the rod 58. Correspondingly, the vane 58 is no longer axially held by the rod 58. Under the effect of the elastic stress to which it is subjected, namely by the spring 55, in our example, the vane 58 then moves laterally until the bearing surface 52*f* of the vane 52 abuts against the protuberance 53*a* of the case 1*a*. When moving, the vane 62 pivots the trigger-gate 56 about the axis thereof 57. Consequently, the triggering bar 15 is moved, the effect of which is to actuate the triggering mechanism of the cut-off device 2. Consequently, the varistor 11 is disconnected from the electrical power lines of the installation.

After triggering the electrical cut-off device 2, by the actuating means 12, it is impossible for a user to manually reset the cut-off device by means of the reset lever thereof 2*b*. As a matter of fact, the triggering bar 15 is held in the triggering position by reason of the elastic stress of the vane 2 against the protuberance 53*a* of the case 1*a*.

In these various embodiments using a bimetallic strip as a thermosensitive member, the bimetallic strip has a purely thermalmechanical function. In other words, a current does not pass through the bimetallic strip in order for it to heat up, and therefore does not itself convey the electric current to the protection component, even though a bimetallic strip has an intrinsically conductive nature, and neither is there an auxiliary thermoelectric circuit of the bimetallic strip which is specifically intended to heat the bimetallic strip by converting a current into heat, e.g., the current flowing through the protection component, such as coils surround the bimetallic strip in order to heat same via the Joule effect.

As a matter of fact, as concerns monitoring the temperature attainable by the protection component, the bimetallic strip advantageously enables the immediate determination thereof via the thermal connection. It might be possible to also use it as a conductor in the electric circuit, but this has the disadvantage of having to take into account the resistive nature thereof, which leads to heating it in addition to the overheating obtained by the thermal connection with the protection component. Furthermore, this makes it possible to prevent undesirable current loop effects, which could result in the generation of mechanical forces harmful to the reliability and operation of the device.

For the same reasons, it is preferable to not provide for an auxiliary thermoelectric circuit for the bimetallic strip, which is specifically intended to heat the bimetallic strip by converting the current passing through the protection component into heat. As a matter of fact, this has the disadvantage of being an indirect detection of the temperature and, in the end, more complex and more costly to implement. The design of the device is not only simplified, but the detection is also particularly reliable when the overheating of the bimetallic strip is obtained exclusively by means of the thermal connection.

Generally speaking, the fact of making use of a thermosensitive member having a purely thermomechanical operation is advantageous for these same reasons.

Figure 7:
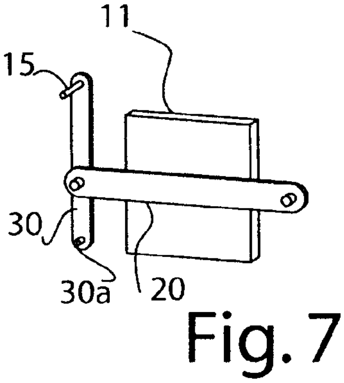
FIG. 7 shows a fourth embodiment of the functional portion of a protection module according to the invention.

FIG. 7 shows a fourth embodiment of the functional portion of a protection module according to the invention. In this case, the thermosensitive member consists of a heat-retractable bar 20. The latter can be made of any appropriate heat-retractable material, which, for example, can be chosen from amongst a polyolefin, a fluoropolymer such as PVC, FEP, PTFE, Kynar® and PVDF, and a chlorinated polyolefin such as neoprene. The heat-retractable bar 20 is attached at one end 20*a* in a case 1*a*. The actuating means 12 also include a lever 30 mounted pivotably in the case 1*a*, e.g., by one of the ends thereof 30*a*. The other end of the lever 30 bears the triggering bar 15 intended to cooperate with the triggering mechanism of the cut-off device 2. The heat-retractable bar 20 shrinks and thereby causes the lever 30 to pivot. Under the influence of an increase in its temperature beyond a given threshold, the bar 20 retracts and thereby causes the lever 30 to pivot. Correspondingly, the triggering bar 15 actuates the triggering mechanism of the cut-off device 2. The heat-retractable bar 20 advantageously obtains the locking operation, in order to lock the actuating means 12 in the triggering position, when they have caused the disconnecting switch 8 open. As a matter of fact, the heat-retractable bar 20 no longer resumes the initial conformation thereof when cooled, due to the very nature of the heat-retractable materials. The heat-retractable bar 20 can be replaced by a heat-retractable material having any other appropriate shape.

Figure 8A:
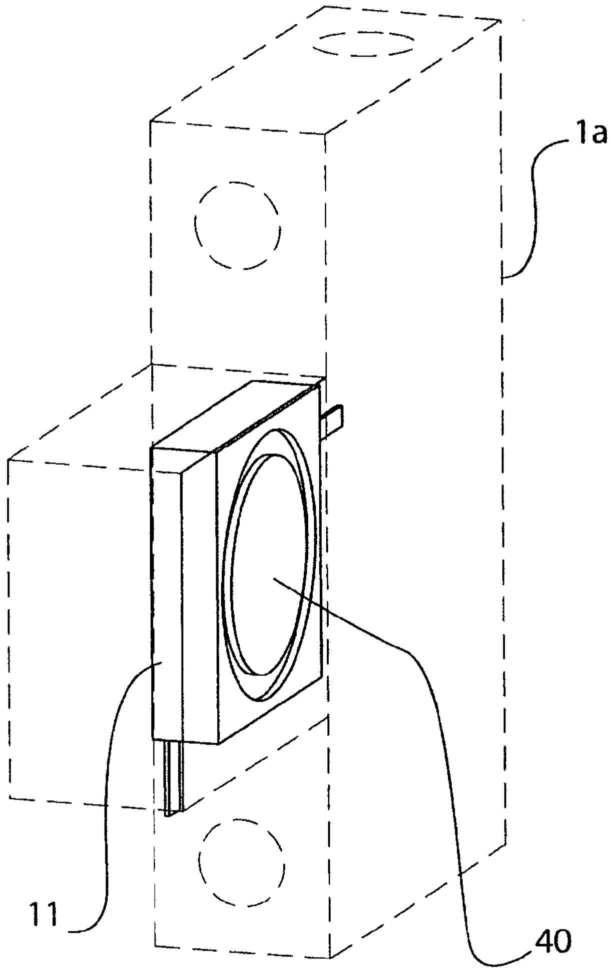
Figure 8B:
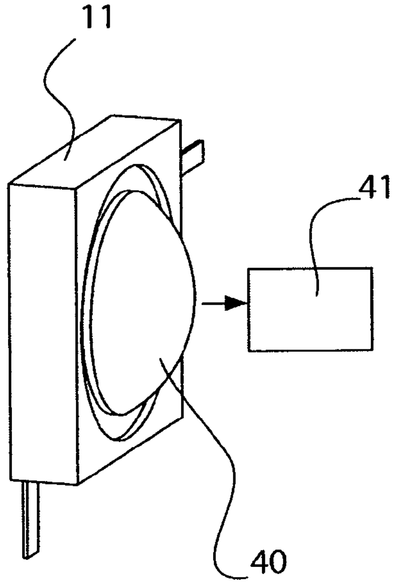
Figure 9A:
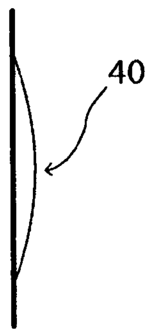
Figure 9B:
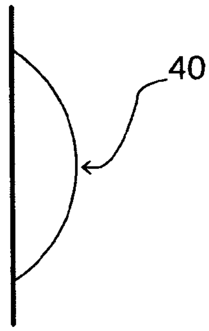

FIGS. 8*a* and 8*b* show a fifth embodiment of the functional portion of a protection module. In this embodiment, the thermosensitive member is a deformable capsule 40 filled with a fluid causing deformation of the capsule based on the temperature thereof. Preferably, deformation of the capsule 40, which serves to actuate the triggering mechanism of the circuit breaker, is caused by vaporization of the fluid, which obtains a substantially bistable deformation property. The capsule 40 is arranged on the principal face of the varistor 11. FIGS. 8*a* and 9*a* show the capsule 40 at ambient temperature, which corresponds to the normal operation of the device. In the event of overheating of the varistor 11, the fluid contained in the capsule 40 vaporises when reaching the latent heat of vaporisation, and the capsule 40 thus swells, as shown in FIGS. 8*b* and 9*b*. The capsule 40 then acts on a mechanism, symbolised by the reference sign 41, thereby transmitting movement to a triggering bar, which cooperates with the triggering mechanism of the cut-off device 2 in order to actuate same. The mechanism 41, for example, can be the tripper 15, 21, 22, 23 of FIG. 4, in which case the capsule 40 and the tripper are arranged such that the capsule 40 acts on the vane 22 in the event of swelling, in order to cause the mast 21 to pivot. Similarly, the mechanism 41 can be that of the embodiments of FIGS. 10 to 14, which includes the vane 52 and the trigger-gate 56, of that of FIGS. 15 and 16 including the vane 52, the rod 58 and the trigger-gate 56. The capsule 40, or at least the deformable face thereof, can be made of copper and designed to be deformable, e.g., in a way similar to the capsules used in pressure-measuring devices such as barometers, monometers or aircraft altimeters. The fluid in the capsule 40 is preferably a refrigerant fluid. It is chosen based on the desired vaporisation temperature. This may involve a hydrofluorocarbon (HFC) chosen, for example, from amongst R14, R23, R125, R134a, R152a, R227, R404A, R407C, 410A, R413A, R417A, R507, R508B, Isceon® 59, Isceon® 89, Forane® 23 or Forane® FX 80. Here again, means can be provided for locking the mechanism 41, in order to prevent the return thereof to the non-triggering position, once the cut-off device 2 has shifted into the triggered position, due to the expansion of the capsule 40.

In all of the embodiments described, it is possible to also anticipate a thermal connection between the spark gap 13 and the thermosensitive member. This can also involve a conductive-type connection, but it can more simply involve a convection-type convection due to the confinement obtained by the case 1*a*, or even by radiation.

One advantage of the invention lies in the fact that the locking means only impede resetting of the cut-off device 2 in the event of a failure of the varistor 11, and not in the event of a self-triggering of the magnetic circuit of the cut-off device 2. Thus, in the exemplary embodiment shown in FIG. 1, the flow of a significant fault current or else a definitive failure of the spark gap 13 could cause an activation of the magnetic circuit of the cut-off device 2. The locking means would then not be opposed to an operation intended to reset the cut-off device 2. However, in the event of a definitive and irreversible degradation of the varistor 11 or of the spark gap 13, the persistence of the failure, in this case, the short-circuit, would result in the immediate return of the cut-off device 2 to the triggered state thereof. Securing all of the protection components is therefore ensured by the protection device according to the invention.

Furthermore, the user has feedback to the extent that he knows that a reset lever for the cut-off device 2 which is unlocked but which instantaneously returns to the triggering position thereof, thereby preventing any resetting, corresponds to a definitive failure of the varistor 11 and/or spark gap 13.

The protection device according to the invention thus makes it possible to guarantee the security of a protection component, irrespective of the failure mode of said protection component and without shutting off the electrical power supply to said service.

The protection module 1 according to the invention has actuating means which further enable a particularly direct counter movement between the thermosensitive member and the triggering mechanism, by means of an advantageously simple, compact and inexpensive means.

In all of the embodiments described, the cut-off device 2 had only a single cut-off contact. Alternatively, it may include two cut-off contacts whereby the protection module is connected to the phase and the neutral conductor of the electrical power supply, respectively.

In all of the embodiments described, the protection module 1 and the cut-off device 2 have their respective case. Alternatively, the protection module 1 and the cut-off device 2 can be built into a single case. However, the fact that the protection module 1 has its own case 1*a* advantageously enables same to be used with standard commercial cut-off devices, such as magnetic or thermomagnetic circuit breakers, having their own case 2*a*, and to do so without any modification. In particular, the protection module can be associated, preferably in a removable way, with any circuit breaker model of a given line, in order to use the one having the desired electrical features, e.g., in consideration of the desired cut-off capacity and operating curves for the anticipated application.

Whether the protection module has its own case or whether it is built into a common case together with the cut-off device, it is advantageous for this case to be anticipated for mounting on and dismounting from a conventional coupling or connection track.

In all of the embodiments described in FIGS. 2 to 9*b*, the thermosensitive member, by reason of the deformation thereof, itself moves the mechanical member or members, including the triggering bar 15, which cooperate with the triggering mechanism of the cut-off device 2, for the purposes of actuating same. Alternatively, provisions can be made for the thermosensitive member, by reason of the deformation thereof, to cause a movement of these mechanical members in order to actuate the triggering mechanism of the cut-off device 2, not by itself moving this mechanical member or members, but, by reason of the deformation thereof, allowing the movement of same under the influence of an elastic biasing of this member or members, in opposition to the deformable portion of the thermosensitive element, as is the case in the embodiments of FIGS. 10 to 16. It may be preferable for this thermosensitive member itself to move this member or these members, because this prevents having to provide for means of stressing same against the thermosensitive member. However, it may be more advantageous, as in the embodiments of FIGS. 10 to 16, for the actuating force applied by the trigger-gate 56 on the triggering mechanism of the cut-off device 2 to not be provided by the bimetallic strip 50 or any other thermosensitive member which might be used in place of the bimetallic strip 50, but by separate elastic stressing means consisting of the spring 55, in the examples shown. Consequently, it suffices for the bimetallic strip 50, or more generally speaking for the thermosensitive member used, to be capable of providing a sufficient degree of effort to release the vane 52 from the stop-motion device thereof 53*a* or 58*c*. This effort can be significantly less than the force required to actuate the triggering mechanism of the cut-off device 2, which is provided by the elastic stressing means, the spring 55 in the examples shown, which are designed accordingly. Therefore, the operation of the protection module 1 is more reliable and the design of the thermosensitive member is simplified, or that even enables the use of thermosenstive members which cannot provide sufficient force alone to actuate the triggering mechanism of the cut-off device 2.

The invention is also advantageous because the protection module 1 does not require any specific means for being insulated from the electrical power supply, the cut-off device 2 alone ensuring the electrical insulation of the protection components, irrespective of the failure.

The invention is likewise advantageous because it makes use of a cut-off device which in and of itself has one or more electrical contacts serving to break the electrical circuit in which the device is inserted, and the contact force of which, as well as the force applied thereto in order to cause the opening thereof are determined by a mechanism specific to the cut-off device. The contact force and the opening force of the contacts are therefore separate from the elements external to the cut-off device and serving to actuate same. In particular, the contact force and opening force of the contacts are not dependent on the effort that the thermosensitive member can provide, and, conversely, for example, by the bimetallic strip in the devices described in WO 2004/064213.

Depending on the chosen embodiment, the invention enables reliably safe use, with a reduced number of constituent elements, a simple and compact structure, simple and fast assembly and disassembly on a coupling or assembly track, easy monitoring of the operating condition with visual and sensory feedback as to the operating condition thereof, and without involving any unavailability of the electrical power supply network in the event of a failure of the protection device.

This invention, of course, is not limited to the examples and embodiments described and shown, but is susceptible of numerous alternatives accessible to a person skilled in the art.

The invention claimed is:

1. An overvoltage protection device for use with an electrical cut-off device triggered by a trigger system, the device comprising: at least one overvoltage protection component; a thermosensitive member capable of deforming, dependent upon the temperature thereof; a thermal connection between the at least one protection component and the thermosensitive member; and at least one resettable mechanical member for cooperating with the thermosensitive member and capable of cooperating with the trigger system for resettably triggering the electrical cut-off device; wherein the thermosensitive member and the at least one mechanical member are arranged such that, when the thermosensitive member exceeds a given temperature threshold, the thermosensitive member, by reason of the deformation thereof, causes a movement of said at least one mechanical member capable of actuating the trigger system for triggering the electrical cut-off device to cut-off electrical power to said at least one overvoltage protection component without cutting off electrical power to users of said electrical power external to said overvoltage protection device.

2. The device of claim 1, wherein the thermosensitive member and the at least one mechanical member are arranged such that, when the thermosenstive member exceeds a given temperature threshold, the thermosensitive member, by reason of the deformation thereof, moves said at least one mechanical member in order to actuate the trigger system for triggering the electrical cut-off device.

3. The device as claimed in claim 1 wherein the thermosensitive member is selected from the group consisting of: a bimetallic strip, a heat-retractable element, and a deformable capsule filled with a fluid causing deformation of the capsule when the fluid exceeds said given temperature threshold, the fluid preferably being a refrigerant fluid.

4. The device as claimed in claim 1 wherein the thermosensitive member has a bistable deformation property giving to it a stable non-deformed configuration as long as its temperature thereof does not exceed the given temperature threshold, as well as a stable deformed configuration when its temperature thereof exceeds the given temperature threshold.

5. The device as claimed in claim 1 wherein said at least one mechanical member is an element made in a single piece by means of which the thermosensitive element, by reason of the deformation thereof, is capable of actuating the trigger system of the cut-off device.

6. The device as claimed in claim 1 wherein said at least one mechanical member includes an element forming a mast mounted pivotably about an axis of rotation and upon which mast is arranged: a triggering bar intended to cooperate with the trigger system for triggering the cut-off device, said triggering bar extending in a substantially orthogonal direction relative to the axis of rotation of said mast; and a rigid vane offset radially relative to the axis of rotation of the mast, wherein said vane is arranged such that the thermosensitive member, under the influence of the deformation thereof, exerts an effort on the vane in order to cause the mast to pivot.

7. The device as claimed in claim 1 wherein said at least one mechanical member includes: a first member mounted movably; and a second member mounted movably, on which is arranged a triggering bar intended to cooperate with the trigger system for the cut-off device: in which: the first member is maintained in a first position via elastic biasing against a stop-motion device; the thermosensitive member is arranged such that, by reason of the deformation thereof, it causes the first member to disengage from the stop-motion device when the thermosensitive member exceeds said given temperature threshold, the disengagement of the first member from the stop-motion device causing the first member to move beyond the stop-motion device via elastic biasing; and the second member is coupled to the first member such that said movement of the first member results in a movement of the second member capable of actuating the trigger system for triggering the cut-off device.

8. The device of claim 7, wherein: the first member is mounted to pivot or swivel about an axis; and the thermosensitive member is arranged so as to cause the disengagement of the first member from the stop-motion device by pivoting or swiveling the first member, said movement of the first member beyond the stop-motion device being a translational movement along the pivoting or swiveling axis of the first member.

9. The device of claim 7, wherein said at least one mechanical member further includes a third member, in which: the stop-motion device is arranged on the third member; the thermosensitive member is arranged so as to cause the first member to disengage from the stop-motion device by moving the third member.

10. The device as claimed in claim 8, wherein the second member is mounted pivotally.

11. The device as claimed in claim 1, further comprising a locking system for locking said at least one mechanical member in an actuating position of the trigger system when the thermosensitive member, by reason of the deformation thereof, has caused a movement of said at least one mechanical member capable of actuating the trigger system for triggering the electrical cut-off device.

12. The device of claim 11, wherein the locking system is provided by a hysteresis-type bistable deformation property of the thermosensitive member.

13. The device as claimed in claim 11 wherein the locking system includes: a stationary stop-motion device having two adjacent and substantially orthogonal bearing faces; and an elastic tab arranged on said at least one mechanical member; and wherein the stop-motion device and the elastic tab are arranged such that: the elastic tab is pre-stressed against the first bearing face when the thermosensitive member, by reason of the deformation thereof, has not yet caused a movement of said at least one mechanical member; and the elastic tab is irreversibly positioned against the second bearing face under the influence of the intrinsic return force of the elastic tab, as soon as the thermosensitive member, by reason of the deformation thereof, has caused a movement of said at least one mechanical member capable of actuating the trigger system of the electrical cut-off device.

14. The device as claimed in claim 1 wherein at least one protection component includes a varistor (11) and optionally a spark gap.

15. The device as claimed in claim 1 wherein the thermosensitive member operates entirely thermomechanically.

16. The device as claimed in claim 1 wherein the thermosensitive member is thermally connected via conduction to the protection component, either by direct contact with a face of the protection component, or by means of an electrode of the thermosensitive member, the greater portion of the thermosensitive member preferably being arranged adjacent to a principal face of the protection component.

17. The device as claimed in claim 1 further comprising a case housing the at least one protection component and the thermosensitive member, the case having a slot through which said at least one mechanical member protrudes from the case in order to cooperate with the trigger system for triggering the cut-off device, when the cut-off device is arranged adjacent to the casing.

18. A protection system comprising: the device as claimed in claim 1; the triggering system; and the cut-off device.

19. The protection system of claim 18, comprising: a first case housing said cut-off device; and a second case housing the at least one protection component and the thermosensitive member; wherein: the first case and the second case are preferably assembled removably; the first case has a first slot providing access to the trigger system for triggering the cut-off device; and the second case has a second slot through which the at least one mechanical member protrudes from the second case and penetrates into the first case via the first slot, in order to cooperate with the trigger system for triggering the cut-off device.

20. The protection system as claimed in claim 18, wherein the cut-off device and the protection component are electrically connected such that actuation of the trigger system of the cut-off device causes the electrical power supply to the protection component to be cut off.

21. The protection system as claimed in claim 18, wherein the cut-off device is a magnetic circuit breaker or a thermomagnetic circuit breaker.

* * * * *